(12) United States Patent
Dietz

(10) Patent No.: US 6,546,795 B1
(45) Date of Patent: Apr. 15, 2003

(54) WIRELESS LIQUID LEVEL SENSING SYSTEM AND METHOD

(75) Inventor: Paul H. Dietz, Hopkinton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 10/008,105

(22) Filed: Nov. 13, 2001

(51) Int. Cl.$^7$ ............................................. G01F 23/00
(52) U.S. Cl. .................. 73/290 R; 324/661; 324/662; 324/687; 324/686; 324/658; 324/657; 324/76.75; 702/52; 340/618
(58) Field of Search ................ 73/290 R; 702/52; 324/687, 661, 662, 686, 658, 654, 76.75; 340/618

(56) References Cited

U.S. PATENT DOCUMENTS

| | | | | |
|---|---|---|---|---|
| 3,876,037 A | * | 4/1975 | Rath, Jr. ........................ 184/6.4 |
| 4,099,167 A | * | 7/1978 | Pomerantz et al. .......... 340/620 |
| 4,173,892 A | * | 11/1979 | Khurgin ....................... 361/284 |
| 4,448,071 A | | 5/1984 | Tward | |
| 4,470,008 A | * | 9/1984 | Kato ............................ 222/639 |
| 4,531,406 A | * | 7/1985 | Fritz ........................... 73/290 V |
| 4,589,077 A | | 5/1986 | Pope | |
| 4,782,698 A | * | 11/1988 | Wilson ........................ 374/142 |
| 5,209,115 A | * | 5/1993 | Bond ........................... 219/438 |
| 5,270,210 A | | 12/1993 | Weyraunch et al. | |
| 5,465,619 A | * | 11/1995 | Sotack et al. ................ 118/694 |
| 5,602,540 A | * | 2/1997 | Spillman, Jr. ........... 340/870.31 |
| 5,832,772 A | * | 11/1998 | McEwan ...................... 340/562 |
| 6,278,381 B1 | * | 8/2001 | Bogert ......................... 307/326 |

* cited by examiner

Primary Examiner—Daniel S. Larkin
Assistant Examiner—André K. Jackson
(74) Attorney, Agent, or Firm—Dirk Brinkman; Andrew J. Curtin

(57) ABSTRACT

A wireless liquid sensing system includes a beverage container and a table top for holding the container. Embedded in the walls and bottom of the container are two electrically conductive plates coupled to a transponder wire coil. A reader radiates an RF signal at a predetermined frequency through a reader antenna. A microprocessor, also coupled to the transponder coil and the two plates, is powered by a rectifier circuit that gains power from then radiated RF signal. The microprocessor amplitude modulates the RF signal in accordance with the amount of liquid in the container. The reader can then detect this modulation with a peak detector to sense the amount of the substance in the container when the transponder antenna is inductively coupled to the reader antenna at the predetermined frequency.

17 Claims, 5 Drawing Sheets

WIRELESS LIQUID LEVEL SENSING SYSTEM AND METHOD

FIELD OF THE INVENTION

This invention relates generally to systems and methods for sensing levels or quantities of substances in containers, and more particularly, to sensing liquid levels using capacitive coupling.

BACKGROUND OF THE INVENTION

There are numerous applications that require the sensing of a liquid level in a container, and numerous methods for sensing the level or amount of the liquid in a container. Primitive techniques use a dip-stick. Many other containers incorporate floats coupled to a variable resistor. Photodiode sensors can also be used with opaque liquids and transparent containers.

One whole class of techniques use capacitive plate type immersion, see U.S. Pat. Nos. 4,448,071, 5,270,210, and 4,589,077. The problem with immersion type sensing is that the "probe" is in contact with the liquid. This may not be desirable in applications where contamination of the liquid must be avoided, e.g., in toxic, radioactive, or biological applications, and for consumable goods. Also, in all of these techniques, the probe is wired to sensing circuits. This makes it difficult to move the container around, or to carry the container from one location to another.

Therefore, it is desired to sense the level of a liquid without direct contact with the liquid, and, in addition, it is desired that the sensing can be performed via a wireless connection to provide for a portable container.

SUMMARY OF THE INVENTION

The invention provides a wireless liquid sensing system that includes a beverage container and a table top for holding the container. Embedded in the walls and bottom of the container, for example a water glass, are two electrically conductive plates coupled to a transponder wire coil.

A wireless reader, embedded in the table top, radiates an RF signal at a predetermined frequency through a reader antenna. A microprocessor in the container, also coupled to the transponder coil and the two plates, is powered by a rectifier circuit that gains power from then radiated RF signal. The microprocessor amplitude modulates the RF signal in accordance with the amount of liquid in the container. The reader can then detect this modulation with a peak detector to sense the amount of the substance in the container when the transponder antenna is inductively coupled to the reader antenna at the predetermined frequency. The modulation can be done by loading the transponder coil.

DETAILED DESCRIPTION OF THE PREFERRED EMBODIMENT

The invention provides a wireless system and method for sensing a level or quantity of a liquid in a container. The apparatus can be embedded in a beverage container such as a water pitcher, coffee cup, or any other container that can hold any substance, liquid or solid, having dielectric, permative, or conductive characteristics.

In a restaurant application, the wireless sensing system can indicate when a pitcher, cup or glass needs to be refilled. As an advantage, the sensing is via a wireless connection. This means the container does not need to be connected by wires to any other sensing equipment. This is a requirement when the container needs to be picked up, put down, moved around, and possibly shared between multiple people.

Second, the container does not need an internal power supply. This is also important for two reasons. First, batteries need never be replaced. Second, the electronic components can be completely embedded in the container in a water proof manner, so that the container can be washed or sterilized without the danger of damaging the sensing circuits.

System Structure

Figure 1:
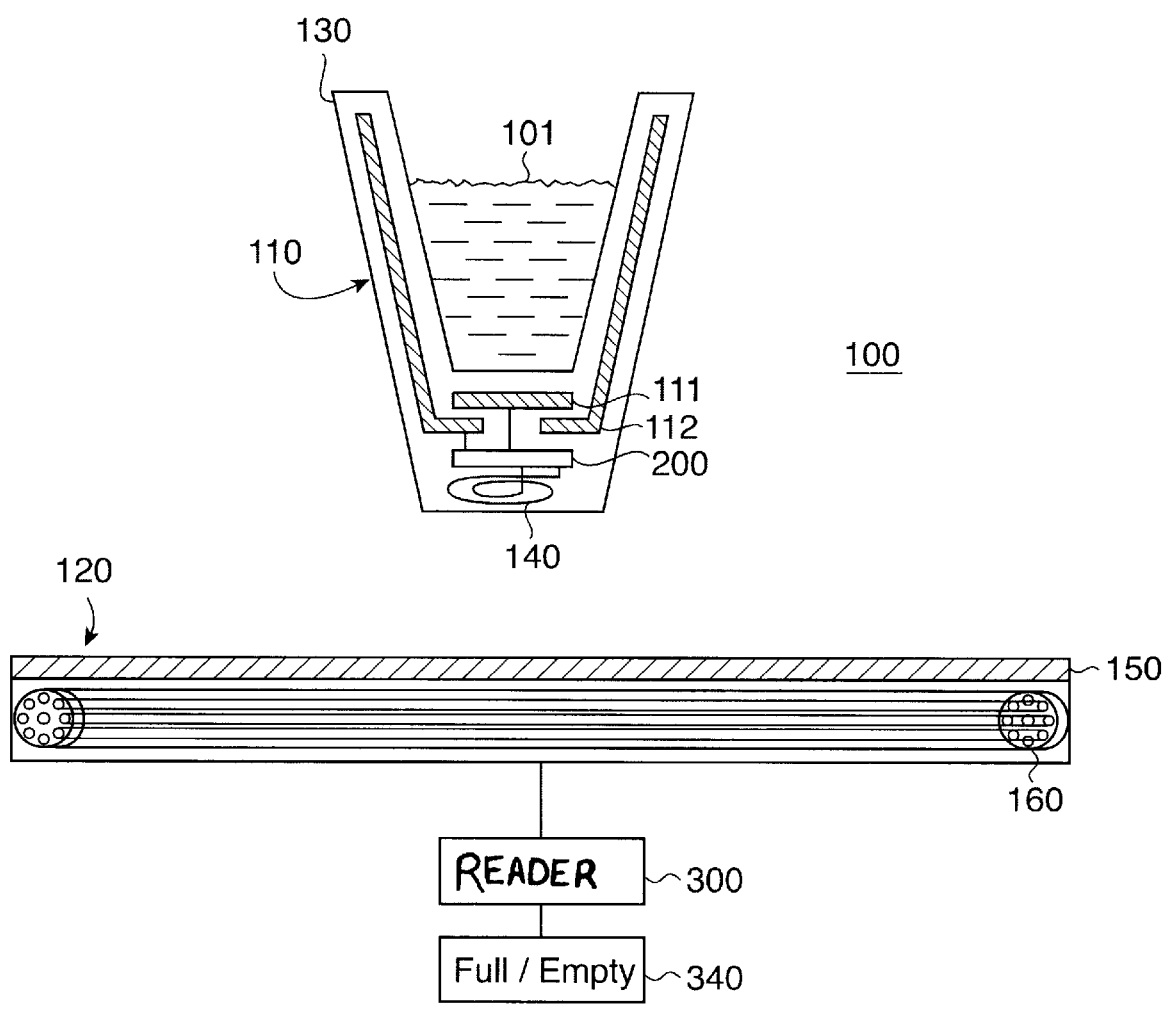
FIG. 1 is a cross-sectional view of a liquid sensing system according to the invention.

FIG. 1 shows a system 100, according to the invention, for sensing a level or quantity of a liquid 101 in a container 130. The system 100 includes a wireless transponder 200 and a wireless reader 300 that can be inductively coupled to each other as described below in greater detail.

Active Transponder

The wireless transponder 200 is mounted in or on the container 130 including walls and a bottom 110. Embedded in the walls and bottom of the container 130 are two electrically conductive plates 111–112 coupled to the transponder 200. The plates 111–112 can be in the form of metallic foils or plating, or a wire mesh embedded or otherwise attached to the walls and the bottom of the container 130. The wireless transponder 200 is also connected to a transponder antenna 140, e.g., in the form of a wire coil. The wireless transponder 200 is described in greater detail below.

Reader

The wireless reader 300 can be mounted in a table or counter top, or any other type of surface or base 120, e.g., a work or lab bench that can support the container 110. A reader antenna 160 is embedded or otherwise attached to the surface. In most applications, the cross-sectional area of the reader antenna 160 is substantially larger than the cross-sectional area of the transponder antenna 140. For example, the reader antenna 160 is mounted along the periphery of the surface 120 and is in the form of a wire coil, and the container 130 can be placed anywhere on the surface of the table for the sensing according to the invention to work.

It should be understood, that the antennas 140 and 160 can be of any size and configuration that allows inductive coupling when the antennas are near each other. In the preferred embodiments, the antennas are in the form of copper wire coils. The reader antenna 160 is coupled to the wireless reader 300 described in greater detail below. The reader 300 can be coupled to an input/output interface (LCD) 340. In automated processes, the reader 300 can be coupled to equipment that fills and empties the container automatically depending on a level of liquid in the container. For example, liquid is replenished as it evaporates.

System Operation

During operation, the reader 300 drives the reader antenna 160 with a tuned, resonant circuit. This causes the antenna 160 to radiate an RF signal. When the container 130 is near the reader 300, the transponder antenna 140 couples inductively to the radiated RF signal. This inductive coupling, in part, can be used to power the transponder 200, e.g., nominally at five volts, as described in detail below.

The container 130 is filled with a liquid, or none at all. The plates 111–112 are coupled capacitively and proportionally to the amount of liquid in the container. The capacitive coupling is sensed by the transponder circuit 200 and converted to a signal which is used to modulate the inductive coupling between the transponder and receiver antennas. The modulation can be amplitude modulation. The modulation can be effected by loading the transponder antenna 140, e.g., by shorting the antenna 140. This alters the load on the reader antenna 160 which can be detected by the reader 300 as a data packet, and converted to an output signal for the interface 340, indicating the level of the liquid in the container 130 as described below.

Identification and Collisions

The transponder 200 can also store a unique identification number. In this case, different liquid level in multiple containers can be sensed. The sensing can be made concurrent by using anti-collision communications techniques. There are several methods for dealing with collisions caused by multiple containers trying to concurrently send data. The simplest method allows collisions to happen, but detects and minimizes their occurrence.

Detection of colliding data can be realized via a checksum sent with each packet. Collisions can be minimized by making the packets short, and separating the packets in time. In addition, using different delays between packets prevents packet transmissions from being synchronized and causing a never-ending stream of collisions. The unique identification number of each container can be used to derive unique packet delays for each transponder.

Two-Way Communication

Alternatively, by arranging the system 100 to allow two-way communications between the transponder 200 and the reader 300, each container can be specifically queried for its data. Two-way communication also allows the reader to send dated information about the substance in the container. This information can then be stored in the transponder 300. This allows another reader, at a later time, to ascertain not only the level of liquid but also the liquid type, and its "freshness."

Practical Considerations

There are a number of other practical considerations. A human hand holding the container should not impact the sensing, neither should tilting the container. Undesirable interactions with the reader antenna should also be avoided. Preventing the hand from impacting the sensing requires shielding the capacitance being sensed. The most straightforward way of accomplishing this is to shielded the bottom plate 111 by extending the side plate 112 down and under it as shown in FIG. 1. Here, the side plate has a throughhole to permit a connection between the bottom plate and the transponder 200.

In addition, care must be taken to insure that the side plate 112 is not overly susceptible to stray fields. In a capacitance-sensing circuit, this can be done by tying a insensitive plate to circuit ground. Tilt is dealt with as follows. If the entire outside of the container is covered by a plate, and the container is essentially cylindrical, then the capacitance is minimally affected by tilt because the area of coupling is substantial constant, and independent of tilt. The greater area coupled on one side by liquid when tilting is compensated for by the lesser coupled on the other side.

Transponder Circuit

Figure 2:
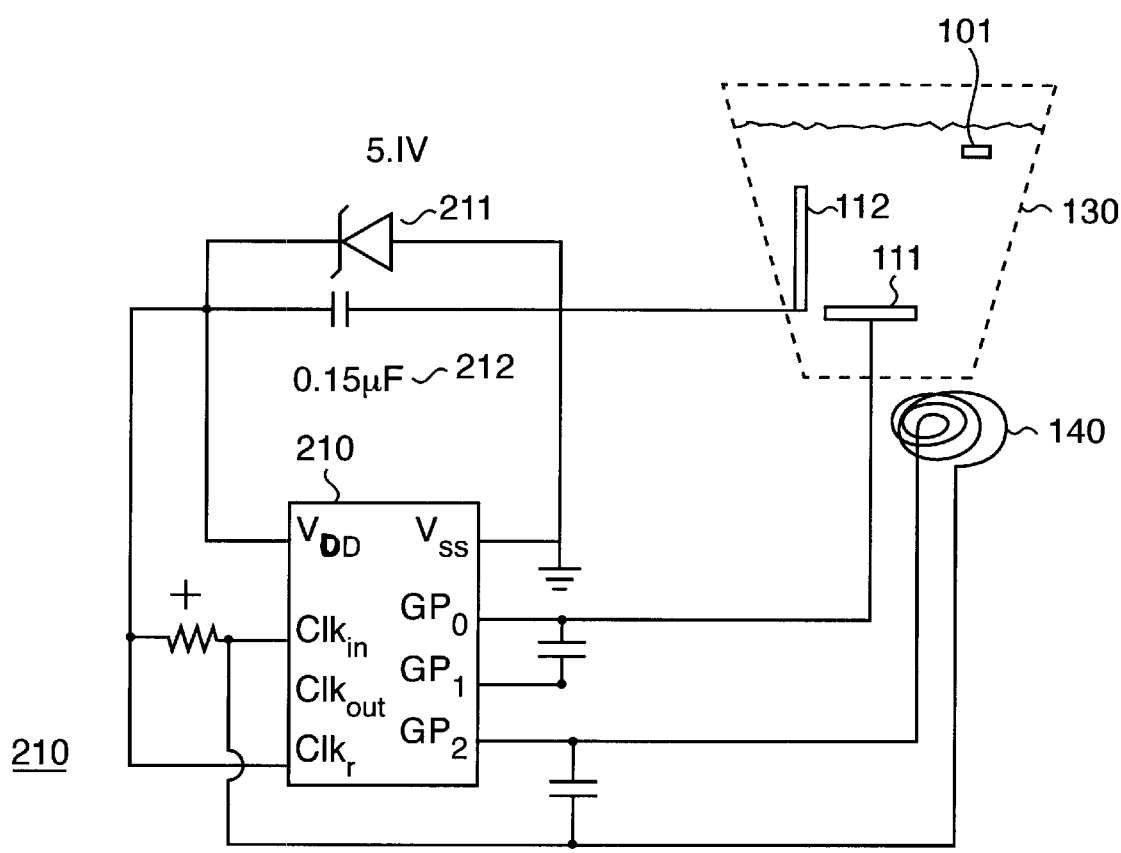
FIG. 2 is a circuit diagram of an active transponder circuit according to the invention.

FIG. 2 shows the wireless transponder 200 in greater detail. The transponder 200 uses a microprocessor 210, e.g., a PIC12C509A, from Microchip Technology Inc. The $V_{DD}$ and $V_{SS}$ pins, in combination with the Zener diode 211 and filter capacitor 212, effectively form a rectifier circuit gaining power from an inductively coupled 100 KHz RF signal radiated by the reader 300. This circuit generates enough power to run the microprocessor 210. The microprocessor is software programmed to sense the capacitive coupling of the plates 111 and 112 by the liquid 101, and to convert the sensed signal to a digital signal using, for example, Manchester encoding. The frequency of amplitude modulation is about ten to a hundred times lower than the frequency of the radiated RF field. This modulation can be detected in the reader by a peak detector.

Reader Circuit

Figure 3:
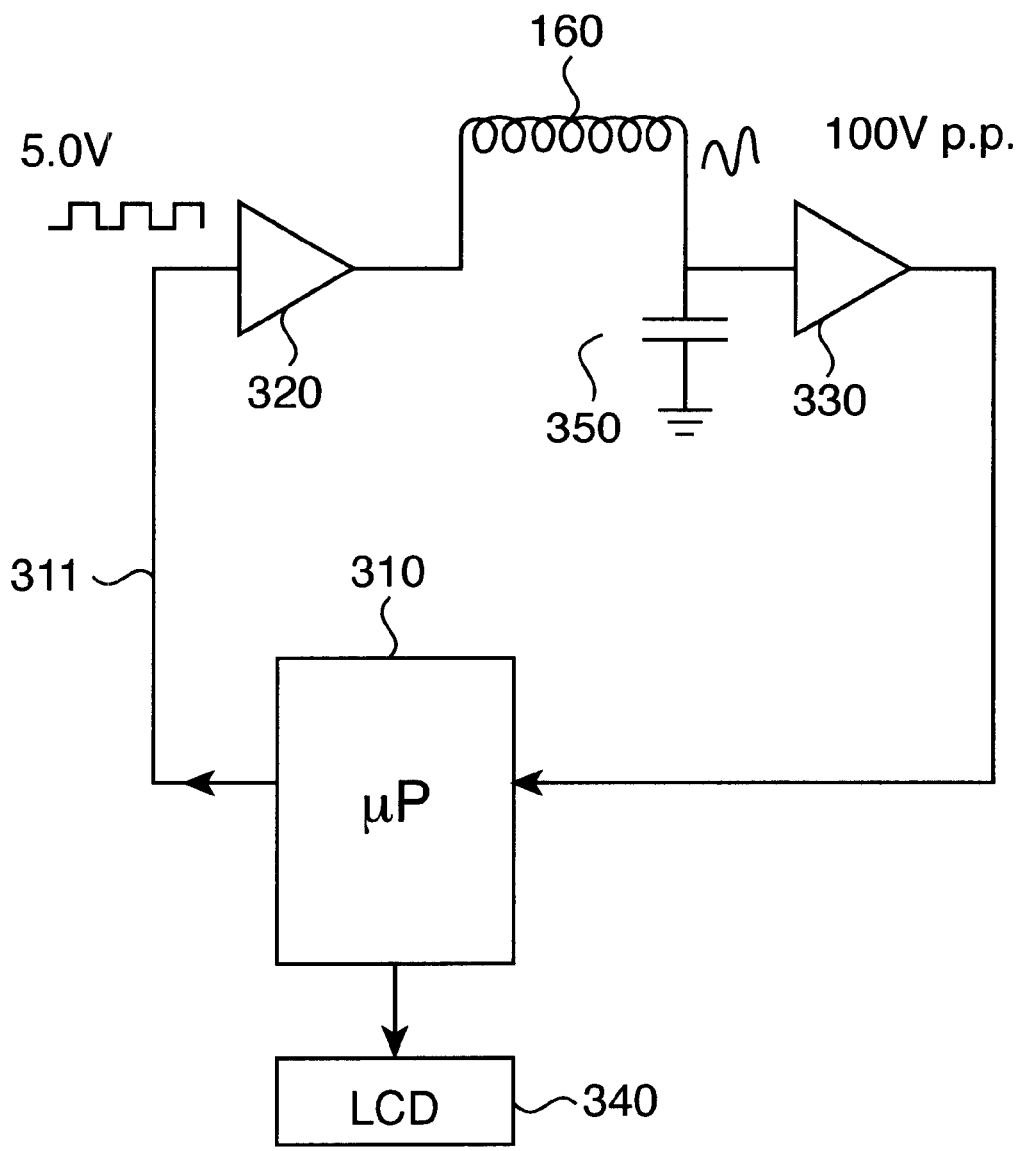
FIG. 3 is a circuit diagram of a reader circuit according to the invention.

FIG. 3 shows the wireless reader 300 in greater detail. This circuit uses a reader microprocessor 310, e.g., a PIC16F876. This circuit produces the drive signal 311 which is fed to a power driver circuit 320 to drive a resonant tank, formed by coil 160 and capacitor 350, at 100 KHz. A receiver circuit 330 is used to detect the modulations produced by the transponder 200 as described above. Software programs in the microprocessor 310 can convert this signal to an output signal for the interface 140.

Figure 4:
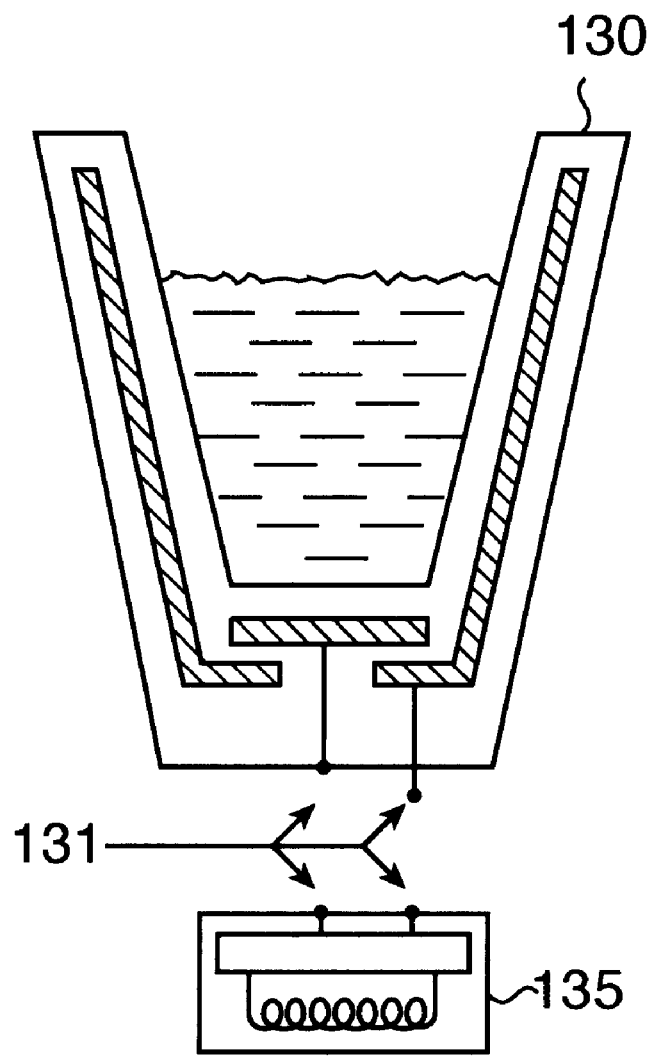
FIG. 4 is a cross-sectional view of a liquid sensing system with a removable transponder.

FIG. 4 shows an alternative embodiment where the container 130 has a detachable base 135 housing the transponder 200 and antenna. Electrical connection between the base and container 130 is provided by spring-loaded pins or plates 131.

Passive Transponder and Reader

Figure 5A:
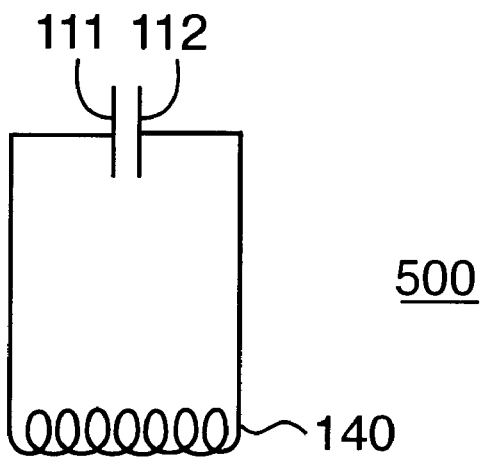
FIGS. 5a–c are diagrams of passive liquid sensing transponder circuits.
Figure 5B:
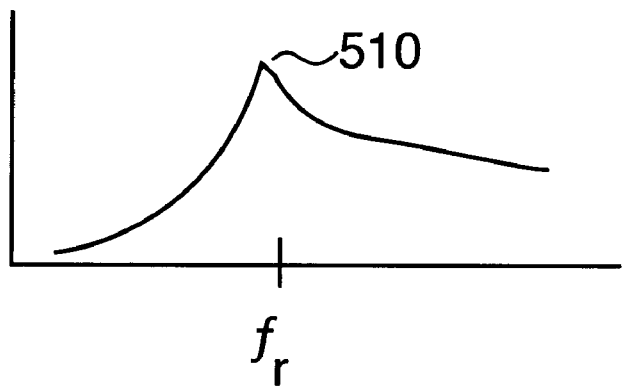
Figure 5C:
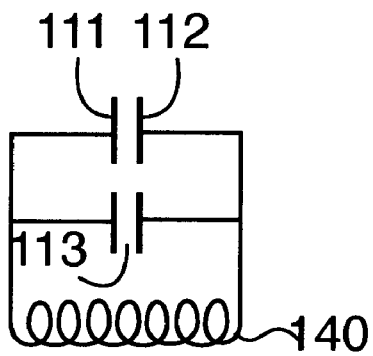

FIG. 5a shows an alternative embodiment 500. In this embodiment, the transponder 110 only includes the antenna 140 and the plates 111–112 forming a capacitor. This essentially forms an LC circuit that resonates at a frequency determined by:

$$f_r = \frac{1}{2\pi\sqrt{LC}},$$

where the "tunable" capacitance is determine by the amount of liquid in the container 130. In this case, as shown in FIG. 5b, the reader 120 sweeps across a range of frequencies to locate a peak representative of the resonant frequency $f_r$. If it is desired to accommodate multiple containers with a single reader with this passive embodiment, than a second fixed value capacitor 113 can be added to provide an offset frequency value that is different for different containers. Instead of operating a fixed frequency, the reader 300 sweeps over a range of frequencies.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

I claim:

1. A system for sensing an amount of a substance, comprising:

a container;

two plates mounted thereon, the plates being electrically conductive;

a transponder antenna coupled to the two plates; and a reader having a reader antenna resonating at a predetermined frequency, the reader sensing an amount of a substance in the container when the transponder antenna is inductively coupled to the reader antenna at the predetermined frequency depending on the amount of the substance in the container.

2. The system of claim 1 wherein the container is a beverage container and the substance is a consumable liquid, and further comprising:

a table top configured to mount the reader antenna along a periphery of a surface of the tabletop.

3. The system of claim 1 wherein a first plate is mounted in walls of the container, and a second plate mounted in a bottom of the container.

4. The system of claim 1 wherein the transponder and reader antennas are in the form of wire coils.

5. The system of claim 1 wherein the reader antenna has a substantially larger cross-sectional area than the transponder antenna.

6. The system of claim 1 wherein the amount of substance in the container is directly controlled in response to the sensing.

7. The system of claim 1 further comprising:

a tuned, resonant circuit for generating a drive signal at the predetermined frequency.

8. The system of claim 1 wherein the predetermined frequency is selected from a range of frequencies, and the predetermined frequency maximizes the inductive coupling.

9. The system of claim 1 including a plurality of containers, each container including the two plates and the transponder coil, and further comprising:

a capacitor coupled to each transponder coil, each capacitor having a capacity unique for each container to offset the predetermined frequencies.

10. The system of claim 1 further comprising:

a microprocessor coupled to the two plates and the transponder coil;

a rectifier circuit coupled to the microprocessor, the rectifier circuit configured to gain power for the microprocessor from the inductive coupling between the transponder and reader antennas.

11. The system of claim 10 further comprising:

means for loading the transponder antenna to modulate the predetermined frequency according to the amount of the substance in the container.

12. The system of claim 11 wherein the modulation is by amplitude.

13. The system of claim 12 wherein the amplitude is measured by a peak detector.

14. The system of claim 10 including a plurality of containers, each container including the two plates, the transponder coil, the microprocessor and the rectifier circuit, and wherein each microprocessor stores a unique identification number for a particular container.

15. The system of claim 10 wherein the microprocessor stores a date and a substance identification.

16. A method for sensing an amount of a substance, comprising:

resonating a reader antenna at a predetermined frequency; and modulating the predetermined frequency in a transponder antenna coupled to two electrically conductive plates mounted in a container according to an amount of substance in the container; and sensing the modulated predetermined frequency in a reader coupled to the reader antenna to determine the amount of substance in the container when the reader and transponder antennas are inductively coupled.

17. A system for sensing an amount of a substance in a container, comprising:

two capacitive plates mounted on the container;

a first coil having ends directly coupled to the two plates; and a reader having a second coil resonating at a predetermined frequency, the reader sensing an amount of a substance in the container when the first coil is inductively coupled to the second coil by capacitively coupling of the two plates at the predetermined frequency depending on the amount of the substance in the container.

* * * * *